(12) United States Patent
Morikawa et al.

(10) Patent No.: US 6,668,659 B2
(45) Date of Patent: Dec. 30, 2003

(54) LOAD DETECTING DEVICE

(75) Inventors: Kenji Morikawa, Kariya (JP); Tetsuo Imamura, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/985,146

(22) Filed: Nov. 1, 2001

(65) Prior Publication Data

US 2002/0053241 A1 May 9, 2002

(30) Foreign Application Priority Data

Nov. 8, 2000 (JP) ........................................ 2000-340655
Apr. 26, 2001 (JP) ........................................ 2001-130123

(51) Int. Cl.[7] ................................................. G01L 7/06
(52) U.S. Cl. ............................. 73/729.1; 73/715; 92/90
(58) Field of Search ............................. 73/729.1, 146.8, 73/393, 4, 398, 715; 303/155; 92/90

(56) References Cited

U.S. PATENT DOCUMENTS

| 3,677,218 A | * | 7/1972 | Dixon et al. ................ 73/146.8 |
| 3,718,047 A | * | 2/1973 | Nakagawa et al. ........... 73/398 |
| 3,718,048 A | * | 2/1973 | Nolte ........................... 73/716 |
| 3,780,588 A | * | 12/1973 | Whitehead et al. ........... 73/398 |
| 5,951,121 A |   | 9/1999 | Takahashi |
| 5,957,121 A | * | 9/1999 | Suzuki et al. ................ 303/155 |
| 5,966,829 A | * | 10/1999 | Lia et al. ..................... 73/729.1 |
| 6,371,227 B2 | * | 4/2002 | Bartlett ....................... 180/24.02 |

FOREIGN PATENT DOCUMENTS

| EP | 0936117 A2 | 8/1999 |
| JP | A-5-139279 | 6/1993 |
| JP | A-8-110273 | 4/1996 |
| JP | A-11-230841 | 8/1999 |
| JP | A-2001-18768 | 1/2000 |
| JP | A-2000-168532 | 6/2000 |
| JP | A-2000-198429 | 7/2000 |

* cited by examiner

*Primary Examiner*—Edward Lefkowitz
*Assistant Examiner*—Alandra Ellington
(74) *Attorney, Agent, or Firm*—Posz & Bethards, PLC

(57) ABSTRACT

In a load detecting device, a hermetically sealed sensor chamber is constituted by a sensor head, a bellows, a housing and a stem. A sensor chip for detecting pressure is housed in the sensor chamber that is filled up with liquid. When load is applied to the sensor head, the bellows contracts axially to vary pressure of the liquid. The sensor chip senses the pressure of the liquid so that the load applied to the sensor chamber is detected with higher detecting accuracy.

17 Claims, 2 Drawing Sheets

LOAD DETECTING DEVICE

CROSS REFERENCE TO RELATED APPLICATION

This application is based upon and claims the benefit of priority of Japanese Patent Applications No. 2000-340655 filed on Nov. 8, 2000 and No. 2001-130123 filed on Apr. 26, 2001, the contents of which are incorporated herein by reference.

BACKGROUND OF THE INVENTION

1. Field of the Invention

The present invention relates to a load detecting device for detecting load applied to a mechanical part, for example, the load applied to a brake pedal when a driver depresses the brake pedal or the load applied to a vehicle body when the car collides.

2. Description of Related Art

A conventional load detecting device has a cylinder, a piston housed in the cylinder, liquid with which inside space between the cylinder and the piston is filled up and a sensor element. When load is inputted to a piston from an outside mechanical part, pressure of the liquid in the cylinder increases according to the movement of the piston. The sensor element senses the pressure of liquid so that the load inputted to the piston is detected.

However, the conventional load detecting device has a drawback that a detecting accuracy is low since there exists a hysteresis of piston movement due to sliding friction between the piston and the cylinder. Further, it is very difficult to completely prevent liquid leakage with a seal between the piston and cylinder, while a life time endurance of the seal is not so long. The liquid leakage causes the piston to shift, resulting in poor detecting accuracy.

Moreover, when eccentric load, which presses the piston not axially but obliquely, is applied to the piston, the piston is likely to incline so that the sliding friction between the piston and the cylinder becomes larger. As a result, the detecting accuracy of the load detecting device is lower.

SUMMARY OF THE INVENTION

An object of the invention is to provide a load detecting device with higher detecting accuracy.

To achieve the above object, a load detecting device has a bellows unit which expands and contracts axially according to a load applied to an axial end thereof. The bellows unit is provided inside with a sensor chamber which is hermetically sealed from outside and whose pressure is variable according to an expanding and contracting movement thereof. A pressure detecting element is installed in the sensor chamber. With this construction, the pressure detecting element detects the pressure of the sensor chamber and generates a signal representing the load applied to the bellows unit.

As the pressure of the sensor chamber inside the bellows unit varies according to the load applied thereto, the load applied to the load detecting device can be detected by sensing the pressure of the sensor chamber with the pressure detecting element.

As mentioned above, the seal between the piston and the cylinder, as the conventional load detecting device has, is not necessary and there is no hysteresis caused by sliding friction due to the seal. Accordingly, the load detecting device, which does not have the seal and the hystresis based on the seal, has a longer life time endurance with higher detecting accuracy.

It is preferable that the sensor chamber is filled up with liquid so that the pressure detecting element detects pressure of the liquid. As a volume change of the liquid due to temperature change can be absorbed by the expansion and contraction of the bellows unit, the load detecting device has better temperature characteristic.

Preferably, the bellows unit is composed of a bellows which is formed in cylindrical shape with hollow and expands and contracts axially, a sensor head fixed fluid-tightly to an axial end opening of the bellows, and a base housing fixed fluid-tightly to an axial another end opening of the bellows. In this case, the pressure detecting element is installed on the base housing and the load is applied to the bellows via the sensor head.

It is preferable that the base housing is composed of a housing, whose outer circumference is fixed to the axial another end opening of the bellows, is provided with a hollow and a stem inserted into the hollow and fixed to the housing so that a part of the hollow remains in the housing on a side of the bellows. In this case, the pressure detecting element is installed on the stem in the remaining part of the hollow.

As an alternative, the bellows unit may be composed of a cup shaped bellows whose cross sectional shape is one side opened square and which expands and contracts axially, a housing fixed fluid-tightly to an opening of the bellows and a sensor head fixed to a bottom of the bellows. In this case, the load is applied to the bellows via the sensor head and the pressure detecting element is installed on the housing.

It is preferable that the sensor head or the housing is provided with a through-hole connecting between an inside of the sensor chamber and an outside thereof and a lid disposed in the through-hole for fluid-tightly sealing the through hole. After the liquid is poured into the sensor chamber, the lid is put in the through-hole so that the manufacturing of the load detecting device is easier.

Further, it is preferable that the sensor head or the base housing has a portion protruding into the sensor chamber beyond a position where the sensor head or the base housing is fixed to the bellows. With this construction, the volume of the sensor chamber becomes smaller so that the volume of the liquid is smaller. Accordingly, since the volume change of the liquid due to temperature change is limited, the load detecting device has better temperature characteristic. In addition to the advantage mentioned above, the protruding portion of the sensor head or the housing serves to prevent the bellows from excessively inclining when the bellows expands and contracts, resulting in a longer life time endurance of the bellows.

Furthermore, it is preferable that the load detecting device has a floating load transmission member having first and second covers coupled axially slidably with each other and a spring disposed between the first and second covers. With the floating load transmission member, the second cover is fixed to the sensor head so that the load, which is applied to the first cover, is transmitted to the bellows via the spring, the second cover and the sensor head.

Moreover, the pressure detecting element is made of, preferably, semiconductor substrate and is provided with a diaphragm portion formed by partly thinning the semiconductor substrate, an element portion for generating an output signal corresponding to pressure acting on the diaphragm portion and a process circuit portion for processing the output signal of the element portion. Since the element portion and the process circuit portion are integrated and housed in the sensor chamber, the distance between the process circuit portion and the element portion is shorter so that the load detecting device is unlikely influenced by radio noises.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

First Embodiment

Figure 1:
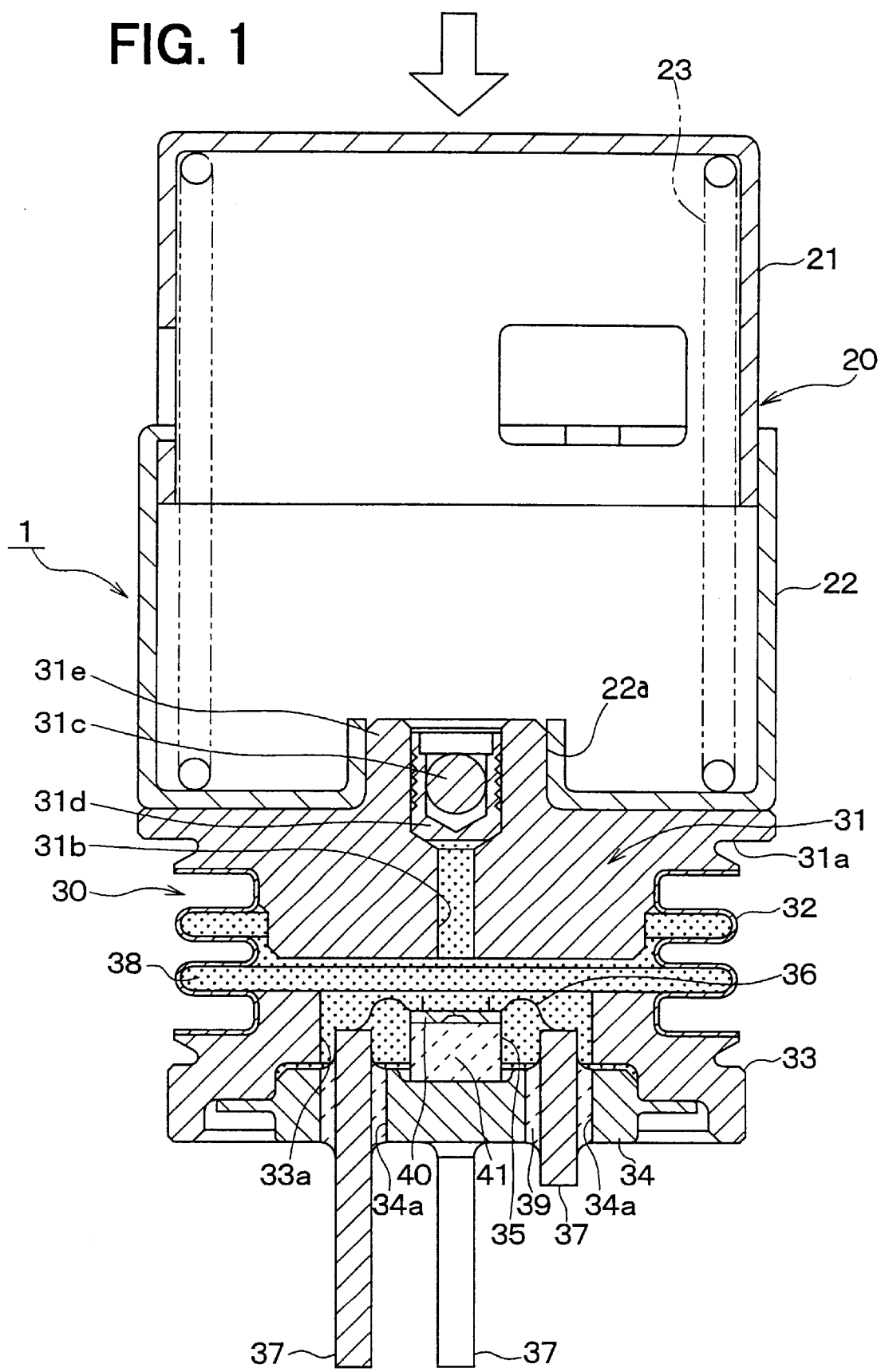
FIG. 1 is a cross sectional view of a load detecting device according to a first embodiment of the present invention.

A structure of a load detecting device 1 according to a first embodiment is described with reference to FIG. 1.

The load detecting device 1 has a load transmission member 20 composed of first and second covers 21 and 22, whose each cross sectional shape is one side opened square, and a spring 23. Load inputted to the load transmission member 20 as shown by an arrow mark in FIG. 1 is detected by the load detecting device 1. The spring 23 is located between the first and second covers 21 and 22. The first cover 21 can move along an inner circumferential surface of the second cover 22 without substantial sliding friction therebetween. Spring force of the spring 23 is set to a value corresponding to largeness of the load inputted. Typically, as the load inputted is larger, the spring force is larger.

The load detecting device 1 is provided with a sensor portion 30. The sensor portion 30 is composed of a sensor head 31, a bellows 32, a housing 33, a stem 34, a sensor chip 35 as a pressure detecting element, terminals 37, bonding wires 36 connecting the sensor chip 35 in circuit with the terminals 37, and liquid 38. The housing 33 and the stem constitute a base housing. The sensor head 31, the bellows 32, the housing 33 and the stem 34 form a bellows unit that constitutes an outer appearance of the sensor portion 30. A sensor chamber, which is formed in the bellows unit, is filled up with the liquid 38.

The sensor head 31 is typically made of metal such as stainless steel and formed roughly in disk shape as a whole. The sensor head 31 is provided with a flange 31a, which is partly enlarged radially outward, and at a center thereof with a through-hole 31b for leading to the sensor chamber the liquid 38 with which the sensor chamber is filled up. The through-hole 31b has a large diameter portion and a small diameter portion. After the sensor chamber is filled up with the liquid 38, a cup 31d, whose outer circumferential surface is provided with grooves, is put inside the large diameter portion of the through-hole 31b, and, then, a ball 31c is press fitted to an inside of the cup 31d so as to expand the cup 31d outward so that hill portions among the grooves at the outer circumferential surface of the cup 31d are caulked to an inner circumferential wall of the through-hole 31b for hermetically sealing the through-hole 31b.

An outer diameter of the flange 31a is larger than that of the bellows 32. Accordingly, any outside member is unlikely to come in contact directly with the bellows 32 so that the bellows 32 is hardly damaged.

The second cover 22 is provided at a bottom surface thereof with a hole 22a for fixing, which is formed by burring.

The bellows 32 is typically made of metal such as stainless steel and formed roughly in cylindrical shape with hollow. The bellows 32 is able to expand and contract axially. A part of the sensor head 31, whose diameter is smaller than that of the flange 31a, is inserted into and welded to an axial end opening of the bellows 32 so that the bellows 32 is fixed to the sensor head 31 so as to hermetically seal the axial end opening thereof.

The part of the sensor head 31, which is inserted into the bellows 32, extends in an inside of the bellows 32 so as to further protrude axially toward the housing 33 beyond a position where the sensor head 31 is welded to the bellows 32. With this construction, a volume of the sensor chamber is smaller so that an amount of the liquid 38 in the sensor chamber is smaller, while the bellows 32 can axially expand and contract sufficiently.

The housing 33 is typically made of metal such as stainless steel and formed roughly in disk shape. The housing 33 is provided at a center thereof with a hollow portion (hollow) 33a and a protruding portion. The protruding portion of the housing 33 is inserted into and welded to an axial another end opening of the bellows 32 50 that the bellows 32 is fixed to the housing 33 so as to hermetically seal the axial another end opening thereof.

An outer diameter of the housing 33 is larger than that of the bellows 32. Accordingly, any outside member is unlikely to come in contact directly with the bellows 32 so that the bellows 32 is hardly damaged.

Figure 2:
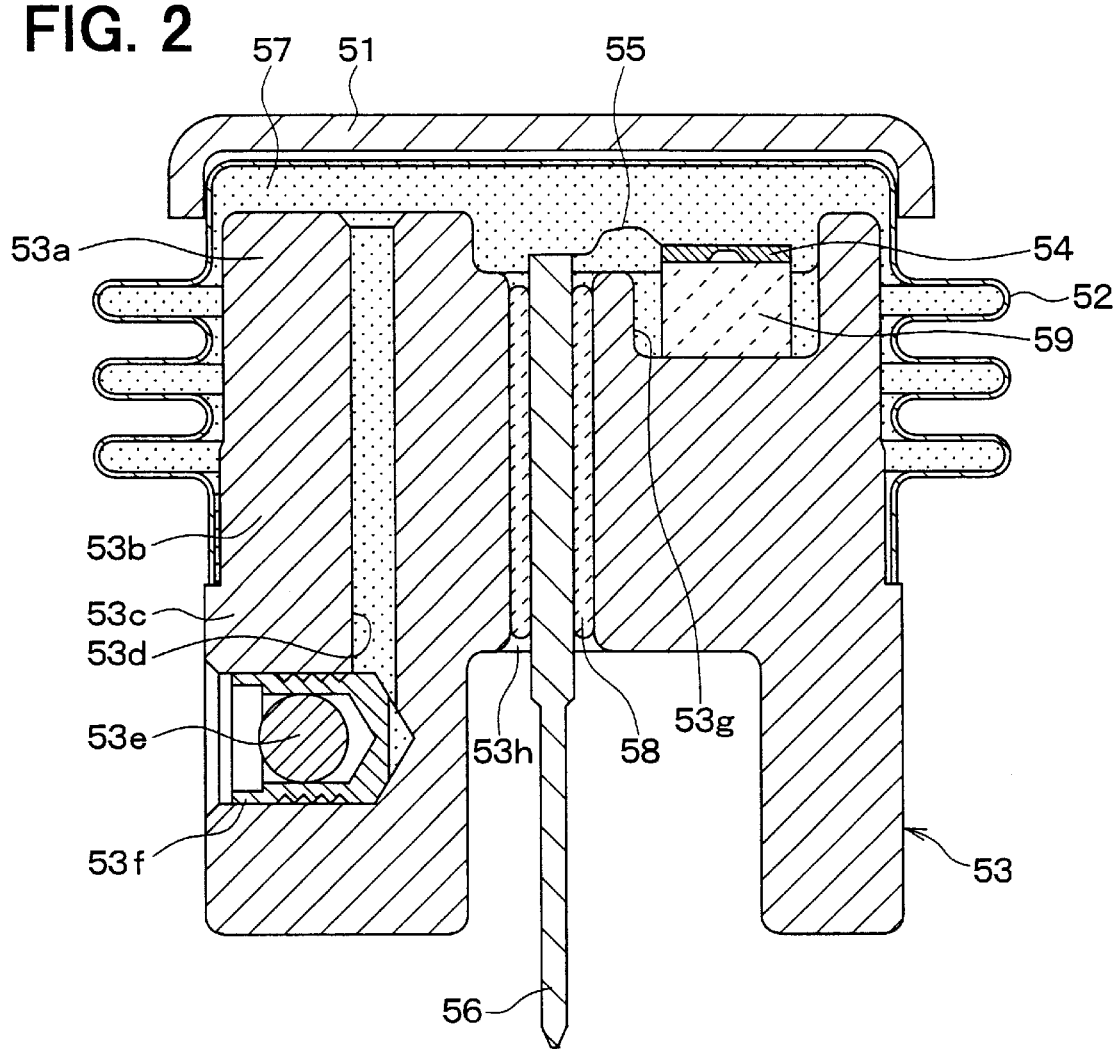
FIG. 2 is a cross sectional view of a load detecting device according to a second embodiment of the present invention.

The sensor chip 35 is installed on and held at a given position by the stem 34. The stem 34 is provided with a plenty of holes 34a (four holes in the first embodiment and two of them are shown in FIG. 2), through which the terminals 37 pass, respectively. The sensor chip 35 is electrically connected with an outside via the terminals 37. The stem 34 is fitted to the hollow 33a of the housing 33. The stem 34, the sensor chip 35, the terminals 37 and the housing 33 form an outline of the sensor portion 30.

After the stem 34 is fitted to the hollow 33a, there remains a part of the hollow 33a (that is, a recess) on a side of the bellows 33. The sensor chip 35 is positioned at the remaining part of the hollow 33a. Respective holes 34a, into which the terminals 37 inserted, are filled with hermetic glass 39 for insulating the terminals 37 from the stem 34 and securing hermetic seal of the holes 34a.

A sensing element constituting a strain gauge in use of piezo resistance effect is formed in the sensor chip 35. In more details, the sensor chip 35 is composed of a detecting element made of semiconductor substrate 40 and a glass base 41 to which the detecting element is bonded. The detecting element is provided with a diaphragm portion formed by partly thinning the semiconductor substrate 40, an element portion formed on the diaphragm portion and composed of four strain gauges connected with each other to constitute a whetstone bridge circuit, and a process circuit portion for amplifying an intermediate output of the whetstone bridge circuit, compensating an offset and compensating an off set temperature characteristic.

The terminals 37 are connected to the sensor chip 35 via the bonding wires 36 and a power source terminal for supplying source voltage to the element portion, a GND terminal for connecting the element portion to the ground and an output terminal for outputting a signal after the intermediate output is processed by the process circuit portion.

The respective bonding wires 36 extend to protrude out of an upper surface of the sensor chip 35 toward the sensor head 31, but do not protrude beyond the most upper portion of the housing 33, since, after the stem 34 is fitted to the hollow 33a of the housing 33, there is still the remaining part of the hollow 33a whose axial depth is sufficiently deep for the sensor chip 35 to be accommodated therein. Accordingly, when the load is inputted to the load detecting device 1 and the sensor head 31 moves downward, the sensor head 31 never comes in contact with the bonding wires 36.

An operation of the load detecting device 1 is described below. When the load is applied to the first cover 21 as shown by the arrow mark in FIG. 1, the spring 23 elastically deforms. The load transmitted to the spring 23 is applied to the sensor head 31 via the second cover 22. The bellows 32 contracts axially by an amount corresponding to the load applied to the sensor head 31 so that pressure of the liquid 38 in the sensor chamber increases since a volume of the sensor chamber reduces. Accordingly, pressure applied to the diaphragm portion of the sensor chip 35 changes so that the intermediate output of the whetstone bridge circuit constituting the element portion changes and a signal corresponding to the load inputted to the load detecting device is outputted from the output terminal 37.

As mentioned above, the load applied to the load detecting device 1 is sensed based on the pressure of the liquid 38 that is variable according to the load applied. Since the pressure of the liquid 38 varies according to the expansion and contraction of the bellows 32 in a state that the liquid 38 is enclosed liquid-tightly in the sensor chamber constituted by the sensor head 31, bellows 32, housing 33 and the stem 34, the seal between the piston and the cylinder, as the conventional load detecting device has, is not necessary and there is no hysteresis caused by sliding friction due to the seal.

Accordingly, the load detecting device 1 according to the first embodiment, which does not have the seal and the hystresis based on the seal, has a longer life time endurance with higher detecting accuracy.

Further, in the conventional load detecting device having the piston and the cylinder, the inclination of the piston due to the load applied eccentrically causes to lower the detecting accuracy. However, in the load detecting device 1 according to the first embodiment, even if the second cover 22 is slanted more or less by the eccentric load, the volume of the liquid 38 in the sensor chamber is scarcely influenced thereby so that the detecting accuracy is not lowered.

Furthermore, since the sensor chip 35 accommodated in the sensor chamber has the semiconductor substrate 40 in which the process circuit portion is integrally incorporated and a distance between the element portion and the process circuit portion is shorter, the load detecting device 1 is unlikely influenced by radio noises.

Second Embodiment

Figure 3:
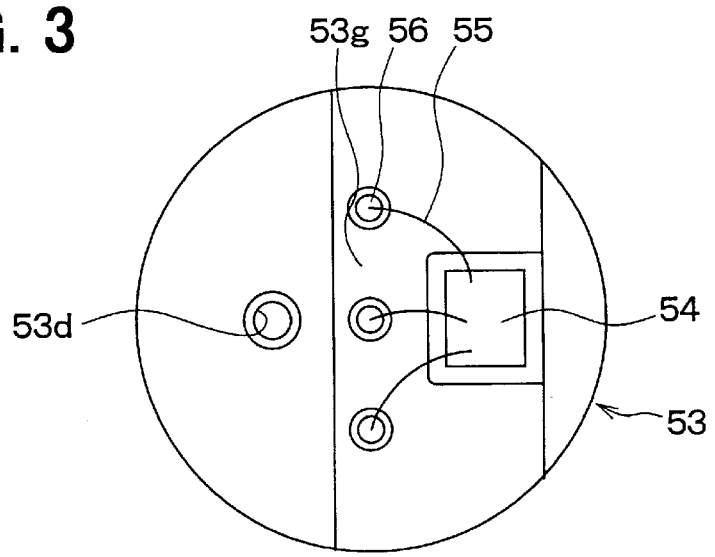
FIG. 3 is a top view of a housing of the load detecting device of FIG. 2.

A load detecting device according to second embodiment is described with references with FIGS. 2 and 3. The load transmission member 20 shown in the first embodiment is also applicable to the second embodiment. However, it explanation is omitted.

FIG. 2 shows across sectional view of the sensor portion of the load detecting device 1. The sensor portion is composed of a sensor head 51, a bellows 52, a housing 53, a sensor chip 54 as a pressure detecting element, terminals 56, bonding wires 55 connecting the sensor chip 54 in circuit with the terminals 56, and liquid 57. The sensor head 51, the bellows 52 and the housing 53 form a bellows unit. A sensor chamber, which is formed in the bellows unit, is filled up with the liquid 57.

The sensor head 51 is typically made of metal such as stainless steel and formed roughly in a cup shape whose cross section is one side opened square. The bellows 52 is fitted to an opening of the cup shaped sensor head 51.

The bellows 52 is typically made of metal such as stainless steel and formed roughly in a cup shape whose cross section is one side opened square. The cup shaped bellows 52 has a side wall which is able to expand and contract axially, that is, in depth direction of the cup. A bottom of the bellows 52 (on a bottom side of the cup) is press fitted to an inside of the sensor head 51 so that the bellows 52 is fixed to the sensor head 51.

The housing 53 is typically made of metal such as stainless steel and formed roughly in a column shape. An end of the housing 53 is inserted into an opening of the cup shaped bellows 52 and an outer circumferential surface of the housing 53 and an inner circumferential surface of the bellows 52 are welded to each other so that the opening of the bellows 52 is hermetically sealed.

A side wall of the housing 53 is formed in a three steps shape and is provided at an end thereof on a side of the bellows 52 with a third region 53a whose outer diameter is smaller than inner diameter of the bellows 52, in a middle thereof with a first region 53b whose outer diameter is slightly smaller than or nearly equal to the inner diameter of the bellows 52, and at another end thereof on a side opposite to the bellows 52 with a second region 53c whose outer diameter is larger than the inner diameter of the bellows 52. The third and first regions 53a and 53b are inserted into the bellows 52 and the outer circumferential surface of the housing 53 at the first region 53b is welded to the inner circumferential surface of the bellows 52 at the opening thereof. The third region 53a, whose outer diameter is smaller than the inner diameter of the bellows 52, is provided to make the housing 53 protrude deeply toward the bottom of the bellows 52 and to prevent the bellows 52 from excessively inclining when the bellows 52 expands and contracts. The third region 53a serves to make a volume of the sensor chamber smaller so that an amount of the liquid 57 poured into the sensor chamber is smaller, while the bellows 52 can axially expand and contract sufficiently.

The housing 53 is further provided with a through-hole 53d extending from an end surface thereof on a side of the bellows 52 to a side surface thereof at the second region 53c so that, after the housing 53 is fixed to the bellows 52, the liquid 57 can be poured into the sensor chamber in the bellows 52 through the through-hole 53d. A lid composed of a ball 53e and a cap 53f whose outer circumferential surface is provided with grooves is put in the through-hole 53d at the second region 53c. As the ball 53e is press fitted to an inside of the cup 53f so as to expand the cup 53f outward, hill portions among the grooves at the outer circumferential surface of the cup 53f are caulked to an inner circumferential wall of the through-hole 53d for securing hermetical seal of the through-hole 53d.

The housing 53 is provided on the end thereof on a side of the bellows 52 with a recess 53g, in which a sensor chip 54 is accommodated. The housing 53 is further provided with a plurality of through-holes 53h penetrating between opposite axial ends thereof. Terminals 56 pass through the through-holes 53h. Respective holes 53h, into which the terminals 56 are inserted, are filled with hermetic glass 39 for insulating the terminals 56 from the housing 53 and securing hermetic seal of the holes 53h. The sensor chip 54 is electrically connected with an outside via the terminals 56.

The sensor chip 54, whose structure is same as the first embodiment, is installed via a glass base 59 on the housing 53 in the recess 53g. The sensor chip 54 generates an output signal based on the pressure of the liquid 57 applied thereto and corresponding to the load inputted to the load detecting device 1. The bonding wires 55 do not protrude beyond the most upper portion of the housing 53, since the sensor chip 54 is installed on a bottom of the recess 53g, so that the bonding wires 55 never come in contact with the bottom of the bellows 52.

In the load detecting device 1 according to the second embodiment, the bellows 52 contracts to make the pressure of the liquid 57 in the sensor chamber increase in a state that the third region 53a of the housing 53 prevents the bellows 52 from inclining when the load is applied to the sensor head 51. The load detecting device 1 according to the second embodiment operates similarly to the first embodiment and outputs a signal corresponding to the load applied from the terminals 56 and has the same advantage as described in the first embodiment.

Further, According to the second embodiment, the bellows 52 is welded only at one position to the housing 53, since the bellows 52 is formed in a cup shape so that the structure of the load detecting device 1 is compact and the manufacturing thereof is easier.

What is claimed is:

1. A load detecting device comprising:
   a bellows unit which expands and contracts axially according to a load applied to an axial end thereof, the bellows unit including a sensor chamber therein, the sensor chamber being hermetically sealed from outside and whose pressure is variable according to an expanding and contracting movement thereof; and
   a pressure detecting element accommodated in the sensor chamber,
   wherein the pressure detecting element detects the pressure of the sensor chamber and generates a signal representing magnitude of the load applied to the bellows unit, and
   the pressure detecting element is made of semiconductor substrate and is provided with a diaphragm portion formed by partly thinning the semiconductor substrate, an element portion for generating an output signal corresponding to pressure acting on the diaphragm portion and a process circuit portion for processing the output signal of the element portion.

2. A load detecting device comprising:
   a bellows unit which expands and contracts axially according to a load applied to an axial end thereof, the bellows unit including a sensor chamber therein, the sensor chamber being hermetically sealed from outside and whose pressure is variable according to an expanding and contracting movement thereof; and
   a pressure detecting element accommodated in the sensor chamber,
   wherein the pressure detecting element detects the pressure of the sensor chamber and generates a signal representing magnitude of the load applied to the bellows unit, and
   the sensor chamber is filled up with liquid so that the pressure detecting element detects pressure of the liquid.

3. A load detecting device according to claim 2, wherein the bellows unit comprises:
   a bellows which is formed in cylindrical shape and expands and contracts axially;
   a sensor head fixed fluid-tightly to an axial end opening of the bellows, the load being applied to the bellows via the sensor head; and
   a base housing fixed fluid-tightly to an axial another end opening of the bellows, the pressure detecting element being installed on the base housing.

4. A load detecting device according to claim 3, wherein the base housing comprises:
   a housing, whose outer circumference is fixed to the axial another end opening of the bellows, being provided with a hollow portion; and
   a stem inserted into the hollow portion and fixed to the housing so that a part of the hollow portion remains in the housing on a side of the bellows, the pressure detecting element being installed on the stem in the remaining part of the hollow portion.

5. A load detecting device according to claim 4, wherein the stem is provided with terminals for connecting the pressure detecting element in circuit with outside.

6. A load detecting device according to claim 3, wherein the sensor head is provided with a through-hole connecting between an inside of the sensor chamber and an outside thereof and a lid disposed in the through-hole for fluid-tightly sealing the through hole.

7. A load detecting device according to claim 3, wherein the sensor head is provided with a flange whose outer diameter is larger than that of the bellows.

8. A load detecting device according to claim 3, wherein at least one of the sensor head and the base housing has a portion protruding into the sensor chamber beyond a position where the at least one of the sensor head and the base housing is fixed to the bellows.

9. A load detecting device according to claim 2, wherein the bellows unit comprises:
   a cup shaped bellows whose cross sectional shape is one side opened square and which expands and contracts axially;
   a housing fixed fluid-tightly to an opening of the bellows, the pressure detecting element being installed on the housing; and
   a sensor head fixed to a bottom of the bellows, the load being applied to the bellows via the sensor head.

10. A load detecting device according to claim 9, wherein the housing is provided with a through-hole connecting between an inside of the sensor chamber and an outside thereof and a lid disposed in the through-hole for fluid-tightly sealing the through-hole.

11. A load detecting device according to claim 9, wherein the housing, whose outer circumference is formed in steps shape, is provided with a first region whose outer diameter is slightly smaller than or substantially equal to an inner diameter of the bellows and with a second region whose outer diameter is larger than the inner diameter of the bellows, the first region being fixed fluid-tightly to the bellows.

12. A load detecting device according to claim 11, wherein the housing is further provided with a third region whose outer diameter is smaller than the inner diameter of the bellows and which protrudes toward the bottom of the bellows beyond the first region, the third region serving to prevent the bellows from excessively inclining when the bellows expands and contracts.

13. A load detecting device according to claim 3 or 9, further comprising:

a floating load transmission member having first and second covers coupled axially slidably with each other and a spring disposed between the first and second covers, wherein the second cover is fixed to the sensor head so that the load, which is applied to the first cover, is transmitted to the bellows via the spring, the second cover and the sensor head.

14. A load detecting device comprising:

a load transmission member for receiving a load, the load transmission member including a spring for elastically deforming when the load is received; and a sensor portion operatively connected to the load transmission member, the sensor portion including a sensor head for receiving the load from the spring, a bellows for contracting axially in accordance with the load and for expanding, and a sensor chip for detecting a pressure change resulting from the force and generating a signal representing a magnitude of the load, wherein:

the bellows includes a sensor chamber therein hermetically sealed from outside, the sensor chamber containing a liquid; and the sensor chip is positioned within the sensor chamber, and the sensor chip detects the pressure change of the liquid in the sensor chamber resulting from the bellows contracting axially.

15. A load detecting device according to claim 14 wherein:

the load transmission member is comprised of a first cover and a second cover, and the spring is disposed between the first cover and the second cover; and the sensor head includes a protrusion for fixing the sensor portion to the load transmission portion by press fitting the protrusion into a hole in the second cover.

16. A load detecting device according to claim 14, wherein the sensor head includes a flange extending radially outward for substantially limiting damage to the bellows.

17. A load detecting device according to claim 14, wherein the sensor head includes a through-hole for providing a fluid passage to the sensor chamber, the through-hole having a large diameter portion and a small diameter portion, the large diameter portion having a cup provided therein.

\* \* \* \* \*